July 19, 1960
W. A. JENNINGS
2,945,662
ADJUSTABLE BRACE CONNECTOR UNIT
Filed March 7, 1955
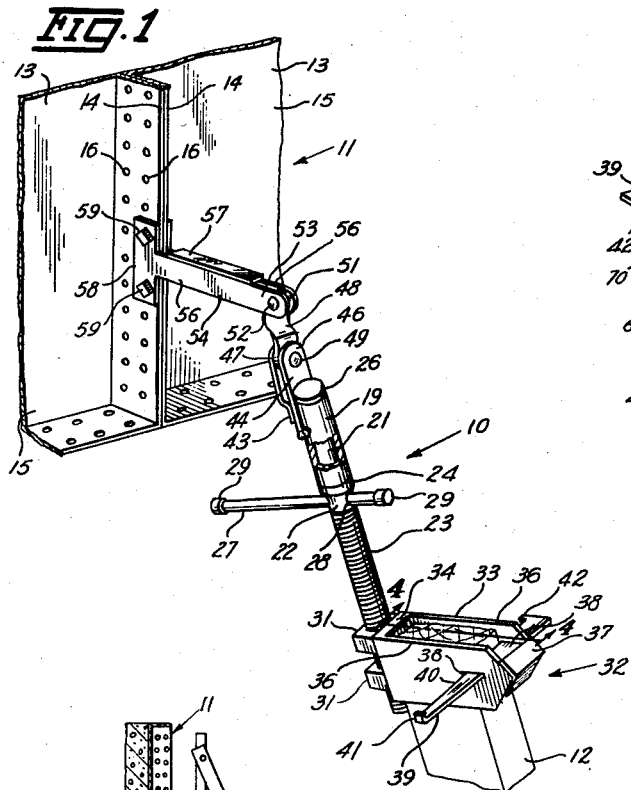
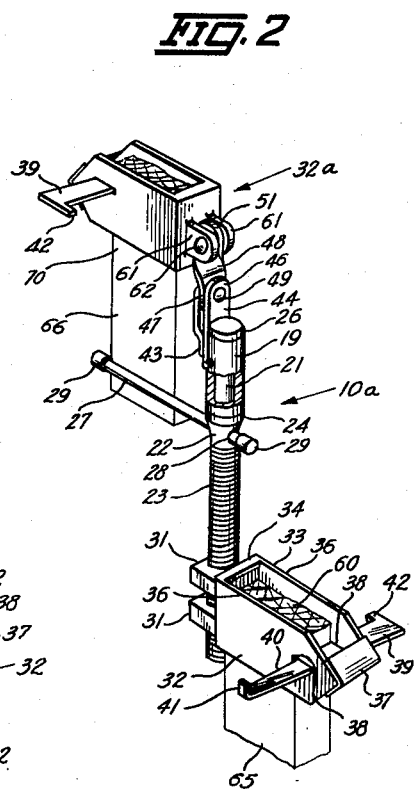
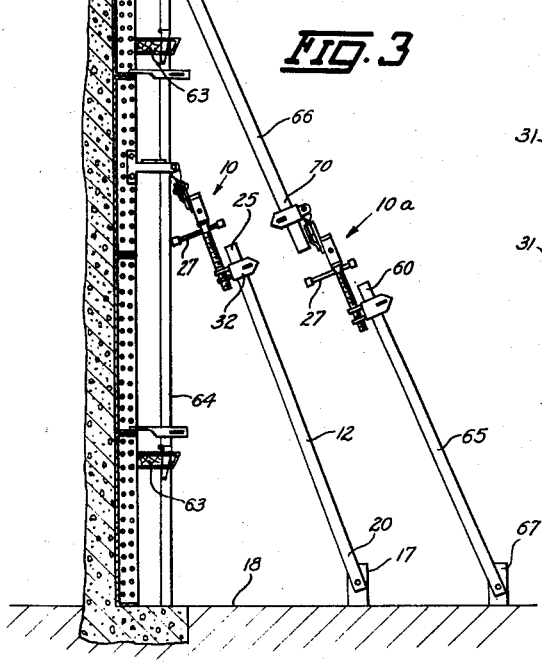
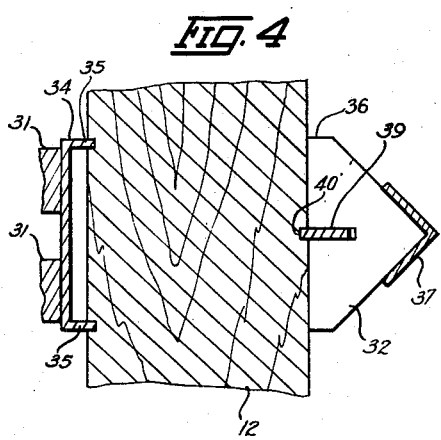
INVENTOR.
WILLIAM A. JENNINGS
BY
ATTORNEY.

2,945,662
Patented July 19, 1960

United States Patent Office

2,945,662
ADJUSTABLE BRACE CONNECTOR UNIT

William A. Jennings, Des Moines, Iowa, assignor to Economy Forms Corporation, Des Moines, Iowa, a corporation of Iowa Filed Mar. 7, 1955, Ser. No. 492,367

1 Claim. (Cl. 248—354)

This invention relates generally to connector units and more particularly to a connector unit for brace members used in the forming of concrete structures.

In the forming of concrete structures, such as walls and the like, the usual form members are maintained in upright positions by brace members extended between the upright forms and posts driven into the ground at positions spaced from the forms. The lumber for such braces must be cut to the desired length and then nailed to the ground posts and the form holding members. In many cases it is necessary to splice two or more pieces of lumber in order to form a brace of the correct length. In any event, it is difficult to form the braces of the exact length required to extend between the forms and the ground posts. This invention, therefore, provides an adjustable connector which is useable with a form structure to provide braces of the desired effective lengths. In one embodiment, the connector unit is used to adjustably attach a brace to the form structure and in another embodiment to adjustably connect a pair of lumber pieces to thus form a brace.

An object of this invention, therefore, is to provide an improved connector unit.

A further object of this invention is to provide an adjustable connector unit which includes a clamp assembly for releasably connecting the unit to a brace member.

Another object of this invention is to provide an adjustable connector unit which includes a threaded member having a portion thereof rotatably supported in a bearing and operable on rotation of the member to adjust the effective length of the unit.

Still another object of this invention is to provide an adjustable connector unit which, when assembled with a brace for a concrete form structure, is adjustable to correct any undesired inclination or curvature of the form structure.

A further object of this invention is to provide a connector unit which includes a pair of clamp assemblies for connecting the unit to a pair of brace members whereby to form a brace of a desired length.

Yet a further object of this invention is to provide an adjustable connector unit which is simple in construction, economical to manufacture, and efficient in operation to provide a brace of a desired length and to connect the brace to a concrete form structure.

Further objects, features and advantages of this invention will become apparent from the following description when taken in connection with the accompanying drawing in which:

Fig. 1 is a perspective view of the connector unit of this invention, shown in assembly relation with a concrete form structure and a brace member, only fragmentary portions of which are shown;

Fig. 2 is a perspective view of a modified form of connector unit of this invention, shown in assembly relation with a pair of brace members, only fragmentary portions of which are shown;

Fig. 3 is an elevational view of the connector units shown in Figs. 1 and 2, illustrated in assembly relation with a concrete form structure and braces for the form structure; and Fig. 4 is an enlarged sectional view looking substantially along the line 4—4 in Fig. 1.

With reference to the drawing, a connector unit of this invention, indicated generally at 10, is shown in Fig. 1 in assembly relation with a form structure 11 and a brace member 12. The form structure 11 is of the type comprised of a series of individual metal form members 13 each of which has a base portion 15 provided with a laterally extended wall or rim 14 having rows of spaced openings 16 formed therein. The forms 13 are held together in a usual manner by the provision of locking devices (not shown) which coact with the openings 16 to connect adjacent rims 14 when the forms 13 are arranged in tiers in a side by side relation. The brace member 12 (Fig. 3) extends between the form structure 11 and a post 17 driven into the ground surface 18 at a position spaced horizontally from the form structure 11 and maintains the form structure in an upright position.

The connector unit 10 includes an elongated bearing member 19 which receives one end portion 21 of an elongated shaft 22 formed with a threaded portion 23 arranged outwardly of the bearing 19. Annular stops 24 and 26 on the shaft 21 engage the ends of the bearing 19 and prevents any relative longitudinal movement of the shaft 22 and the bearing 19. A bar 27, loosely extended through an opening 28 formed in the shaft 22 adjacent the stop 24, and provided with end caps 29 of a larger diameter than the opening 28, constitutes a handle and facilitates rotation of the shaft 22 relative to the bearing 19. The threaded portion 23 of the shaft 22 is threadably received in a pair of nuts 31 spaced apart in a direction longitudinally of the shaft 22 and secured to a clamp assembly or connecting member, indicated generally at 32, extended radially of the shaft 22. The clamp assembly 32 consists of a U-shape body member 33 (Fig. 1) having a base portion 34 which carries the nuts 31 and a pair of parallel spaced leg portions 36 extended in a direction away from the nuts 31. An angle member 37 secured to and extended between the free ends of the leg portions 36 maintains the leg portions 36 against relative movement. As shown in Fig. 1, each leg portion 36 is formed with an elongated narrow slot 38 extended in a direction parallel to the leg portion 36 at a position adjacent the terminal end thereof. Received in the slots 38, is a flat tapered wedge member 39 having a lateral projection 41 at one end and a transverse projection 42 at the opposite end which function as stops to maintain the wedge member 39 within the slots 38.

Secured to the bearing 19 at a position adjacent the shaft stop 26, and extended away from the bearing 19 in a direction opposite to the direction in which the shaft 22 is extended, is the closed end 43 of a bifurcated member 44. The opposite or open end 46 of the member 44 receives one end portion 47 of a link 48 pivotally connected to the bifurcated member 44 by a rivet 49. The link 48 is twisted so that the opposite end portion 51 thereof is perpendicular to the end portion 47. The end portion 51 is pivotally connected, by means of a rivet 52, to one end 53 of a connecting member 54, which, as best appears in Fig. 1, is of a generally T-shape in overall appearance. The connecting member 54 consists of a pair of laterally spaced T-shape members 56 maintained in a spaced relation by a connecting strap 57. The transversely extended or cross arms 58 of the T-shape members 56 are positioned on opposite sides of a pair of adjacent form rims 14 and are connected to the rims by bolts 59 extended through the form openings 16 and the cross arms 58.

The modified connector unit 10a illustrated in Fig. 2 is identical with the connector unit 10 except that a clamp assembly or connecting member 32a substantially identical with the clamp assembly 32 used in the connector unit 10, is substituted for the T-shape connecting member 54. Like numerals are used, therefore, on the connector unit 10a to indicate like structure in the connector unit 10. The clamp assembly 32a is provided with spaced ears 61, in place of the nuts 31 on the clamp assembly 32, which receive the end 51 of the link 48 and are pivotally connected thereto by a rivet 62.

In the use of the connector units 10 and 10a (Fig. 3) the connector unit 10 is used with a single brace member 12 and connects the brace member 12 with the form structure 11. The usual transverse wood beams or retaining members 63 are connected to the forms structure 11 for maintaining the form members in a predetermined relation. Upright wood beams or retaining members 64 are in turn connected to the form structure 11 and the transverse beams 63 for further strengthening the form structure 11.

The lower end 20 of the brace member 12 is first nailed to the post 17. With the wedge member 39 withdrawn relative to the body member 33 so that the stop 41 is against the adjacent body member leg portion 36, the upper end 25 of the brace member 12 is extended through the body member 33 between the leg portions 36 thereof. The wedge 39 is advanced so that the side 40 thereof moves the brace member 12 against a pair of inwardly directed flanges or projections 35 on the body member base portion 34. As best appears in Fig. 4, on such movement of the wedge 39, both the side 40 of the wedge 39 and the flanges 35 bite into the adjacent portions of the brace 12. By virtue of this three point bite, the brace member 12 is positively clamped between the wedge 39 and the base 34 so that the end 25 of the brace member 12 is effectively connected to the clamp assembly 32 for the connector unit 10.

The connector unit 10 is then adjusted by manipulating the handle 27 to position the T-shape connecting member 54 such that the free end 58 thereof is in a position to receive the adjacent rims 14 for a pair of form members 13. As a result, the brace member 12 does not have to be of an exact length, since the connector unit 10 is readily adjustable to connect the brace 12 to the desired portion of the form structure 11. Also, should it appear that an intermediate portion of the form structure 11 has leaned or bowed in one direction so that the overall form structure is not exactly vertical, the connector unit 10 is readily adjustable to move the form structure 11 to an exactly vertical position.

The connector unit 10a is used to connect the adjacent ends of a pair of brace members 65 and 66, the lower one of which is connected to a ground post 67 and the upper one of which is connected to the upper end of an upright retaining member 64.

The upper end 60 of the lower brace member 65 is held in the clamp assembly 32 and the lower end 70 of the brace member 66 is held in the clamp assembly 32a by manipulation of the wedges 39 for the assemblies 32 and 32a. The brace members 65 and 66 are thus readily connected to the connector unit 10a. It is apparent that on manipulation of the handle 27 for the connector unit 10a, the brace members 65 and 66 may be moved toward or away from each other to provide a brace of the correct length to extend between the ground post 67 and the upright retaining member 64. Further, if it appears that after the brace, consisting of the brace members 65 and 66 and the connector unit 10a, should be adjusted to straighten the form structure 11 or move the form structure 11 to an inclined or vertical position, the connector unit 10a is readily adjusted to move the form structure 11 to the desired position.

It is seen, therefore, that by virtue of the connector units 10 and 10a, the form structure 11 is readily provided with the desired braces. By using the connector unit 10, the brace member 12 does not have to be cut to an exact length to extend between the ground post 17 and the desired portion of the form structure 11. It is only necessary to clamp one end of the brace member 12 to the connector unit 10, by operation of the clamp assembly 32, which by means of the wedge 39 readily operates to positively clamp the brace member 12 to one end of the connector unit 10. The opposite end of the connector unit 10 is then readily connected to the form structure 11 by means of the connecting member 54, with manipulation of the connector unit 10 providing for the positioning of the connecting member 54 at the desired position on the form structure 11.

By using the connector unit 10a, the brace members 65 and 66 do not have to be spliced or permanently connected in any way, since the connector unit 10a includes the readily operable clamp assemblies 32 and 32a which positively and releasably connect the adjacent ends 60 and 70 of the brace members 65 and 66 respectively. It is apparent from Fig. 3 that the brace members 65 and 66 could be considerably longer than illustrated without interfering in any way with the use of the connector unit 10a, since the adjacent end portions of the brace members 65 and 66 would merely be arranged in an overlapped relation.

Although the invention has been described with respect to a preferred embodiment thereof, it is to be understood that it is not to be so limited, since changes can be made therein which are within the full intended scope of this invention as defined by the appended claim.

I claim:

An adjustable brace connector for leveling concrete forms by varying the distance between a form and an angular brace member comprising jack screw means including a bearing member having an upwardly extending bifurcated section secured thereto and a shaft rotatably held within said bearing member, said shaft being formed with a threaded portion arranged outwardly of said bearing member, link means including a twisted linkage unit pivotally connected to said bifurcated section about an axis which is perpendicular to said shaft, and first and second connecting members removably attached to said concrete form and angular brace member, said connecting members being of U-shaped configuration and having a substantially flat base section, a pair of slotted leg sections held in spaced relationship by said base section and a wedge inserted through said slotted leg sections for movement in a plane parallel to said base section, said base section including a pair of projections at the ends thereof extended toward said wedge, said first connecting member being pivotally connected to the twisted linkage unit of said link means about an axis which is perpendicular to the axis between said linkage unit and said bifurcated section so as to be capable of bidirectional movement through multiple planes, and said second connecting member being provided with an integrally formed internally threaded means extending from said base section thereof, said internally threaded means adjustably receiving therein the threaded portion of said shaft whereby the distance between said first and second connecting members may be varied by rotation of said shaft.

References Cited in the file of this patent

UNITED STATES PATENTS

| | | |
|---|---|---|
| 1,298,970 | Lampert | Apr. 1, 1919 |
| 1,399,603 | Butler | Dec. 6, 1921 |
| 1,559,575 | McMillan | Nov. 3, 1925 |
| 1,649,573 | Clark | Nov. 15, 1927 |
| 1,762,740 | Rains | June 10, 1930 |
| 2,219,169 | Alter | Oct. 22, 1940 |
| 2,684,824 | Hillberg | July 27, 1954 |
| 2,725,210 | Swartz | Nov. 29, 1955 |

FOREIGN PATENTS

| | | |
|---|---|---|
| 24,347 | Great Britain | Nov. 12, 1908 |
| 484,887 | Great Britain | May 11, 1938 |